United States Patent
Peeler et al.

(10) Patent No.: US 6,662,969 B2
(45) Date of Patent: Dec. 16, 2003

(54) HYDRAULICALLY AND VOLUMETRICALLY DISPENSING A TARGET FLUID

(75) Inventors: Scott C. Peeler, Sandy, UT (US); Brian W. Guest, Farmington, UT (US)

(73) Assignee: ZAxis, Inc., Salt Lake City, UT (US)

( * ) Notice: Subject to any disclaimer, the term of this patent is extended or adjusted under 35 U.S.C. 154(b) by 7 days.

(21) Appl. No.: 10/016,970

(22) Filed: Dec. 14, 2001

(65) Prior Publication Data

US 2003/0111486 A1 Jun. 19, 2003

(51) Int. Cl.$^7$ ................................................. G01F 11/00
(52) U.S. Cl. ........................ 222/1; 222/61; 222/63; 222/137; 222/145.5; 222/334; 222/389; 222/390
(58) Field of Search ............................... 222/1, 61, 63, 222/137, 145.3, 145.5, 145.6, 334, 386, 389, 390

(56) References Cited

U.S. PATENT DOCUMENTS

| | | | |
|---|---|---|---|
| 2,752,075 A | * 6/1956 | Hill | 222/334 |
| 3,921,858 A | 11/1975 | Bemm | 222/146 |
| 4,231,494 A | 11/1980 | Greenwood | 222/325 |
| 4,365,728 A | 12/1982 | Tokorozawa et al. | 222/209 |
| 4,955,514 A | 9/1990 | Dickau | 222/518 |
| 4,964,533 A | 10/1990 | Allington et al. | 222/14 |
| 5,022,556 A | * 6/1991 | Dency et al. | 222/1 |
| 5,219,099 A | 6/1993 | Spence et al. | 222/325 |
| 5,226,575 A | 7/1993 | Faust | 222/611.2 |
| 5,238,147 A | * 8/1993 | Yasui et al. | 222/1 |
| 5,290,259 A | * 3/1994 | Fischer | 604/218 |
| 5,476,193 A | * 12/1995 | Haynes | 222/129.2 |
| 5,584,814 A | 12/1996 | Schuster et al. | 604/187 |
| 5,630,527 A | 5/1997 | Beebe et al. | 222/1 |
| 5,765,722 A | * 6/1998 | Beebe et al. | 222/1 |
| 5,816,445 A | * 10/1998 | Gardos et al. | 222/1 |
| 5,816,450 A | 10/1998 | Alexander et al. | 222/179 |
| 5,878,921 A | 3/1999 | Chase et al. | 222/333 |
| 5,964,381 A | 10/1999 | El-Hage et al. | 222/386 |
| 6,041,977 A | 3/2000 | Lisi | 222/389 |
| 6,050,450 A | 4/2000 | Gardos | 222/1 |
| 6,193,111 B1 | 2/2001 | Adams | 222/148 |
| 6,234,795 B1 | * 5/2001 | Fischer | 433/90 |
| 6,268,000 B1 | 7/2001 | Romer | 426/115 |

* cited by examiner

Primary Examiner—Joseph A. Kaufman
(74) Attorney, Agent, or Firm—Kirton & McConkie

(57) ABSTRACT

Systems and methods for hydraulically and volumetrically dispensing target fluid. A hydraulic system includes an actuator, a hydraulic coupler that includes substantially incompressible hydraulic liquid, and a container. The container may include a slidable or movable plunger or wall that when moved forces the target fluid out of the container. The actuator includes a motor or driver, such as a step motor, linear actuator, servomotor, pneumatic motor, or other similar device, to drive a plunger or piston of the hydraulic coupler. The coupler includes a conduit, column, shaft or other leak proof assembly that acts as a conduit for the substantially incompressible hydraulic liquid and includes a plunger or piston that is selectively pushed by the incompressible hydraulic liquid, thereby driving a head of the plunger or piston to press against the wall or plunger of the container or syringe that contains the target fluid or against the target fluid, causing the target fluid to be dispensed therefrom. Furthermore, the system may include a controller that is configured to control the target fluid dispensed and to receive input from a user.

23 Claims, 6 Drawing Sheets

HYDRAULICALLY AND VOLUMETRICALLY DISPENSING A TARGET FLUID

BACKGROUND OF THE INVENTION

1. Field of the Invention

The present invention relates to hydraulically and volumetrically dispensing fluid. More particularly, the present invention relates to systems and methods for dispensing a known volume of a target fluid, whether liquid and/or gas, through the use of a hydraulic system.

2. Background and Related Art

Historically, a variety of techniques have been employed to dispense materials. Such techniques have included pushing a material through a flexible conduit, using a water control valve to provide pressure to a material, employing a water control valve to dispense the material, and using a hand-held applicator that accommodates a syringe, each of which will be discussed below.

A first technique employs a flexible conduit through which a material is pushed. In U.S. Pat. No. 5,878,921, a grout delivery apparatus and method is disclosed for delivering grout through a flexible conduit from a bulk supply of grout to a hand tool. The bulk supply of grout is held in a hopper, which feeds the grout under gravity to a pump. The pump is driven by an electric motor, which receives its electrical energy through a controller. The controller is adjustably preset to control the electric motor as a function of the individual settings on a malfunction switch operable by the worker. The switch can either be mounted on the hand tool and directly wired to the controller or incorporated into a remote transmitter, which transmits the particular switch position to a receiver on the controller. Similarly, U.S. Pat. No. 6,268,000 discloses a device for dispensing pastry dough, frosting, or icing from a cartridge. The device has a cartridge container and a hand-held gun. An electric motor having a piston is coupled to the cartridge container. The piston acts on a plunger of the cartridge to apply pressure on the pastry dough, frosting, or icing to permit the pastry dough, frosting, or icing to move to the gun to be dispensed. The technique in both disclosures requires a material to be pushed through a tube or flexible conduit in order to dispense or apply the material. One disadvantage of this technique is that residue of the material is typically left behind on the inside wall of the tube or conduit that must be cleaned. This requirement of cleaning the tube or conduit can be time consuming and the residue indicates a waste of a portion of the material.

In a second technique, a water control valve is employed to provide direct pressure to a material that is being dispensed. This technique is disclosed in U.S. Pat. No. 6,041,977, which discloses a dispensing system for dispensing decorating materials, such as frosting. The dispensing system includes a dispensing tube having the material to be dispensed and a water-operated piston. Application of water under pressure to the dispensing tube results in the dispensing of the material through a decorating tip. The water pressure applied to the dispensing tube is controlled and regulated through the utilization of a control valve assembly having a flow stop valve and an on/off valve. Water applied to the control valve assembly is pressure regulated and filtered. While this technique reduces the requirement for cleaning and reduces the amount of material wasted, it requires the constant pressurizing of water and typically proves to be awkward in use of some applications.

A third technique employs compressed air to dispense a material. This technique illustrated in U.S. Pat. No. 5,964,381, in which a piston is disposed inside a tube having an inner cross-sectional size and shape uniform along its length. The tube has an open end. The piston is free to move literally inside the tube and preferably may move out of the tube through the open end. If the tube is cylindrical in shape it has a constant inner diameter. The open end of the tube is neither tapered nor flaring. Liquid samples are aspirated into the device by pulling the piston back. The sample is then ejected by accelerating the piston to a minimum velocity to force the liquid sample out of the open end of the tube. The velocity of the sample is sufficient to render negligible effects of surface tension forces. The volume of the liquid sample dispensed is determined by the inner diameter of the tube and the piston displacement. Accurate positioning of the piston provides samples of accurate volumes. This technique can provide an accurate delivery of a material as long as the viscosity of the air does not change. However, a change in atmospheric temperature and/or pressure affects the technique by requiring the system to be adjusted for each given atmospheric modification. As such, this technique can prove to be time consuming, as it requires the calibration to the various surrounding conditions.

Another technique is provided in U.S. Pat. No. 5,630,527, which discloses a fluid dispenser system, and method of use thereof, primarily in industrial applications requiring the dispensing of fluids, such as epoxies, silicones, adhesives, etc., allowing for very precise control of the volume of fluid extruded. The system comprises an ergonomic, hand-held applicator accommodating a conventional medical syringe, wherein the applicator is attached to an electronic control unit by a power cord. The applicator is provided with a stepping motor that drives a piston or screw a specific distance in response to an electronic signal generated by the control unit. Displacement of the piston or screw creates a positive pressure on a fluid contained in the syringe, thereby causing fluid extrusion from the syringe. While this technique can dispense a precise amount of material, the apparatus of the hand-held applicator can prove to be bulky and awkward to use.

Thus, while techniques currently exist that are used to apply or dispense a material, challenges still exist, including causing a portion of the material to be wasted, needing to clean the residue from the material after each use, requiring a calibration of the device for each surrounding condition, and other such challenges. Accordingly, it would be an improvement in the art to augment or even replace current techniques with other techniques.

SUMMARY OF THE INVENTION

The present invention relates to hydraulically and volumetrically dispensing fluid. More particularly, the present invention relates to systems and methods for dispensing a known volume of target fluid through the use of a hydraulic system. As used herein, "known volume" means a metered controlled predeterminable quantity of fluid or in some embodiments a predetermined quantity of fluid which has a controlled volume or quantity such as a bolus.

Implementation of the present invention takes place in association with a target fluid, whether in a liquid and/or gaseous state, that is to be dispensed. A hydraulic system is configured to selectively provide mechanical pressure in order to dispense a volumetric or metered dose of the target fluid from a container, syringe, etc., which includes a slidable or movable plunger or wall that when moved forces the target fluid out of the container or syringe or draws substances into the container or syringe.

In one implementation, a dispensing system includes an actuator, such as a motor or driver, a hydraulic coupler, column or tube that includes substantially incompressible hydraulic liquid, and a mechanical interface to the container or syringe. The actuator may comprise a motor or driver, such as a step motor, linear actuator, servomotor, pneumatic motor, or other similar device, to drive a plunger or piston of the hydraulic coupler. The coupler includes a conduit, column, shaft or other leakproof assembly that acts as a conduit for the substantially incompressible hydraulic liquid. The conduit is connected at one end to a plunger/piston and at the other end to a mechanical interface. The mechanical interface includes a cylinder structure with another plunger or piston that is selectively pushed by the incompressible hydraulic liquid, thereby driving a head of the plunger or piston to press against the wall or plunger of the container or syringe that contains the target fluid, causing the target fluid to be dispensed therefrom. Thus, an actuator selectively provides a force on the hydraulic coupler, which transfers the force to the target fluid to dispense the target fluid from the container. In one implementation, a controller or computer device is coupled to the actuator to accurately dispense a volumetric amount of the target fluid.

While the methods and processes of the present invention have proven to be particularly useful in the area of dispensing a precise amount of target fluid, those skilled in the art can appreciate that the methods and processes can be used in a variety of different applications and in a variety of different areas of manufacture and/or industry to accurately dispensing a volumetric amount of fluid.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to hydraulically and volumetrically dispensing target fluid. More particularly, the present invention relates to systems and methods for dispensing a known volume of target fluid through the use of a hydraulic system.

In the disclosure and in the claims the term "target fluid" shall refer to any material that may be dispensed, whether in a liquid and/or gaseous state. Examples of target fluid include medication, water, oil, grease, paint, adhesive, solvent, lotion, food products (e.g., baby food, condiments, juice, etc.), lubrication, epoxy, silicone, sealant, oxygen, hydrogen, nitrogen, air, and any other liquid and/or gas that have a rheology compatible with being dispensed by physical force. Furthermore, the term "target fluid" shall include materials that are not in a liquid and/or gaseous state, but which may still be dispensed, such as a powder (e.g., graphite), or a paste (e.g., solder paste).

The following disclosure of the present invention is grouped into two subheadings, namely "Hydraulically Dispensing Target fluid" and "Utilizing a Computer Device." The utilization of the subheadings is for convenience of the reader only and is not to be construed as limiting in any sense.

Hydraulically Dispensing Target Fluid

Figure 1:
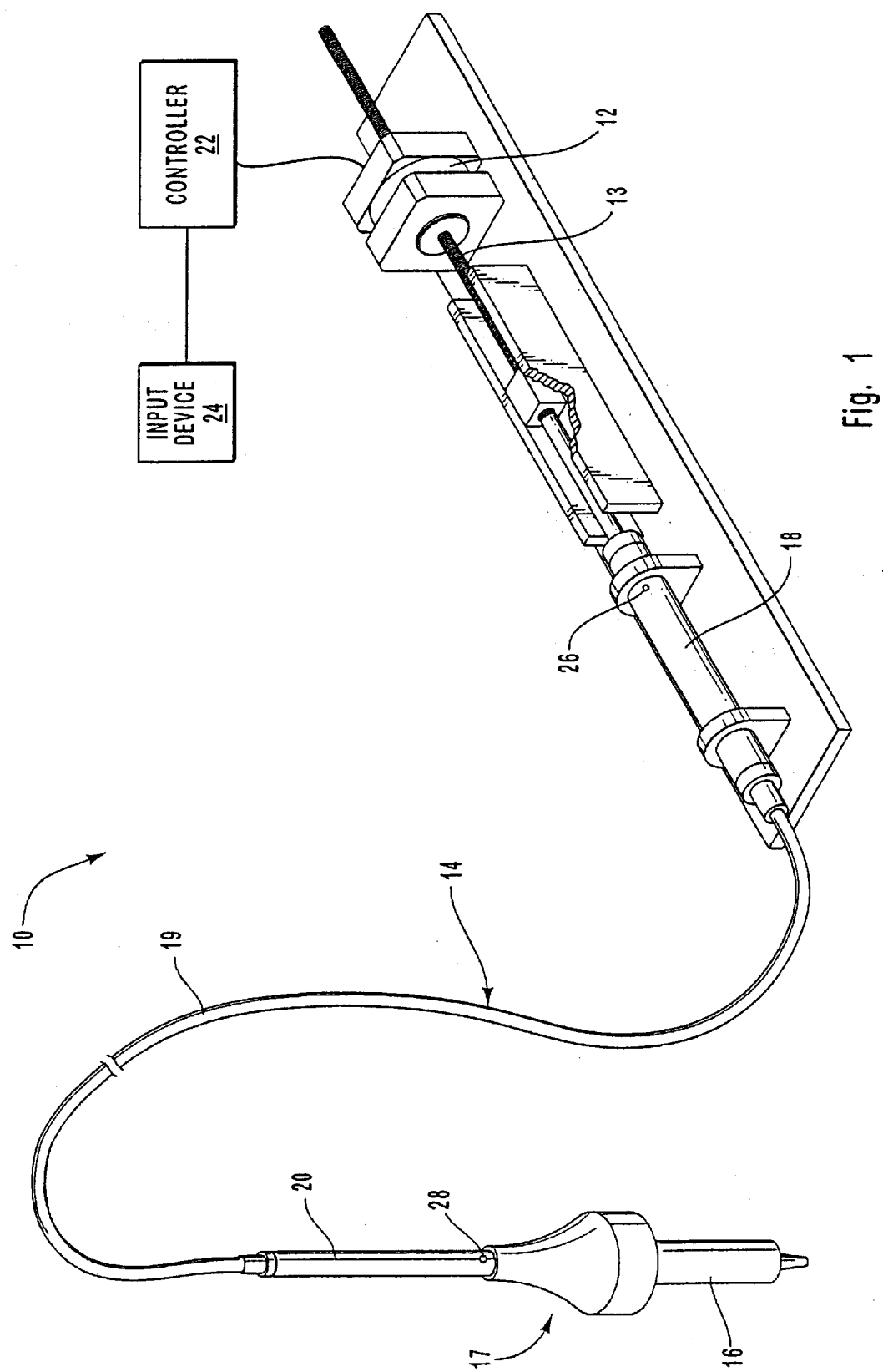
FIG. 1 illustrates a representative system that provides a suitable operating environment to dispense a volumetric amount of target fluid in accordance with the present invention.

Embodiments of the present invention take place in association with a target fluid that is to be dispensed. FIG. 1 and the corresponding discussion are intended to provide a general description of a representative embodiment or suitable operating environment in which the invention may be implemented. One skilled in the art will appreciate that the invention may be practiced by one or more systems, and in a variety of system configurations, to enable target fluid to be hydraulically and volumetrically dispensed in accordance with the present invention.

In FIG. 1, a representative system is illustrated as dispensing system 10 that may be used to selectively dispense target fluid. System 10 includes an actuator 12, a hydraulic coupler 14, and a container of target fluid 16 to be dispensed. Actuator 12 is a driving mechanism, which is an example of actuator means. Particular examples of a driving mechanism include a step motor, a linear actuator, a servomotor, pneumatic motor, a variable frequency drive, or other similar motor or device that may be configured to initiate or create a force at a controlled or selected rate or step.

Actuator 12 creates a linear force on screw 13 that is transferred to hydraulic coupler 14. Coupler 14 is an example of hydraulic means. By way of example, hydraulic coupler 14 comprises a master cylinder 18, a conduit 19, a slave cylinder 20, and optionally a connector 17 for selectively coupling to container 16. Those skilled in the art will appreciate that while cylinders are illustrated in the present embodiment, a variety of different shapes and/or sizes may be used as part of a hydraulic coupler to provide a master-slave relationship.

While FIG. 1 illustrates the use of a block or component that connects screw 13 to a shaft of master cylinder 18, embodiments of the present invention embrace a direct coupling of a cylinder shaft to an actuator. For example, the cylinder shaft is a proximal portion of a piston that may be displaced within a cylinder, wherein the proximal end of the shaft is threaded to directly couple to an actuator.

Figure 2:
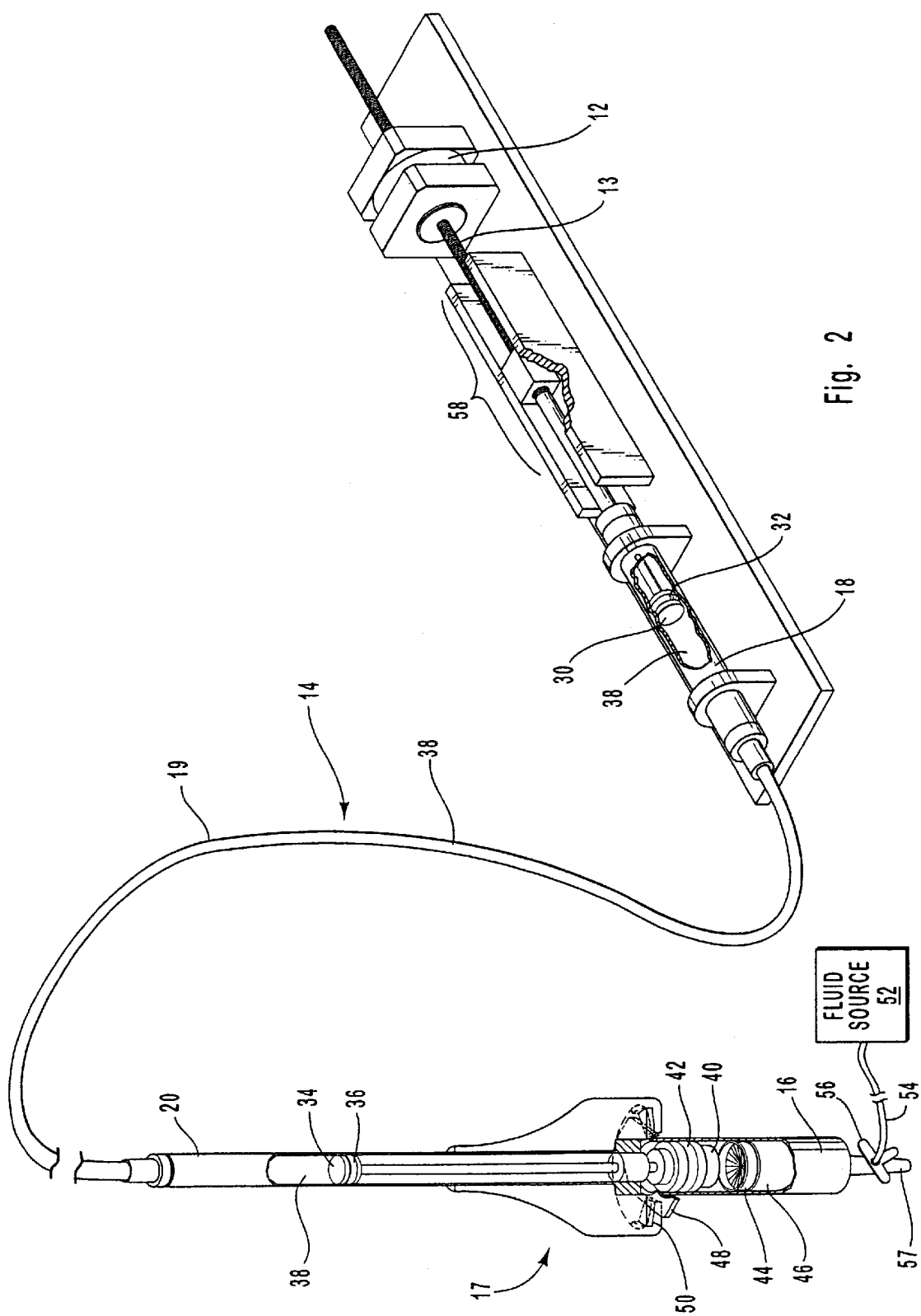
FIG. 2 illustrates a cross-sectional view of various components of the representative system of FIG. 1.

With reference to FIG. 2, hydraulic coupler 14 is configured to contain a substantially incompressible hydraulic liquid 38, such as silicone, water, silicone oil, alcohol, brake fluid, food grade hydraulic liquid, or another hydraulic liquid that has properties preventing expansion or contraction over a broad enough temperature range. Hydraulic liquid 38 extends from a first hydraulic piston head 30, at least a portion of which is contained within master cylinder 18, through conduit 19, and to a second hydraulic piston head 34, at least a portion of which is contained within slave cylinder 20. This allows a force by piston head 30 to transfer to piston head 34, causing the master-slave relationship. Similarly, a force from piston head 34 may be transferred to piston head 30. In order to prevent leakage of hydraulic liquid 38, one or more seals may be placed at or near the respective heads of piston heads 30 and 34. In FIG. 2, the seals are respectively illustrated as O-rings 32 and 36. While an O-ring is illustrated in the present embodiment, those skilled in the art will appreciate that other seals may be used, such as one or more quad seals, or one or more flaps.

In the illustrated embodiment, actuator 12 initiates a force that displaces piston 30. The displacement of a piston, such as piston 30, is an example of actuating the hydraulic means. A force that displaces a piston may be hydraulically transferred to one or more other pistons to selectively dispense a target fluid or fill a container with target fluid.

While the embodiment illustrated in FIG. 2 illustrates a hydraulic coupler/system that comprises two pistons/plungers, embodiments of the present invention embrace hydraulic couplers/systems that comprise more than two pistons/plungers. One such embodiment includes a Y-shaped hydraulic coupler that comprises three pistons/plungers, wherein one is used as a master and the other two are used as slaves.

With reference back to FIG. 1, one or more vents, illustrated as apertures 26 and 28, permit the user to selectively allow for gas, such as atmospheric air, to enter and exit cylinders 18 and 20, thereby allowing piston heads 30 and 34 (FIG. 2) to be displaced as desired. Apertures 26 and 28 may also be used to purge undesirable gases.

FIG. 1, container 16 is configured to contain a target fluid therein and is coupled to hydraulic coupler 14 at connector 17. Container 16 is an example of dispensing means. Furthermore, the term "dispensing means" includes a plurality of dispensing means per hydraulic means. With reference to FIG. 2, a cross-sectional view of system slave cylinder 20, connector 17 and container 16 is provided. In the illustrated embodiment, container 16 is configured to contain a reservoir of target fluid 46 that may be selectively and accurately dispensed from container 16 in accordance with the present invention. In one embodiment, container 16 includes a slidable or movable wall or cap (illustrated as cap 44) to contain and dispense target fluid 46. Other embodiments embrace the use of a slidable or movable plunger to contain and dispense the target fluid.

Container 16 may be removably or fixably coupled to hydraulic coupler 14. In the illustrated embodiment, container 16 includes a surface 48 that may be selectively and rotatably coupled to receiver 50 of connector 17. When coupled, a distal end 40 of piston head 34 extends down at least a portion of container 16. In the illustrated embodiment, a seal 42 is coupled to distal end 40 to prevent target fluid 46 from escaping. Thus, as a force is transferred to piston head 34, distal end 40 moves toward distal end 57 of container 16 to cause an amount of the target fluid 46 to be dispensed therefrom. In a further embodiment, container 16 comprises a polymer and/or is disposible.

In one embodiment, an additional optional feature is disclosed. As illustrated in FIG. 2, container 16 may be coupled to a target fluid source 52 through the use of a target fluid source connector 54. Thus, the withdrawal of piston head 30 or otherwise movement of piston head 34 toward piston head 30 enables target fluid from target fluid source 52 to enter container 16. Furthermore, a valve 56 may be used to selectively fill container 16 with target fluid 46 from target fluid source 52 or dispense target fluid 46 from container 16 through distal end 57.

As provided above, embodiments of the present invention embrace the use of a hydraulic system that is configured to selectively provide controlled mechanical pressure in order to dispense a volumetric or metered dose of the target fluid from a container, syringe, or other target fluid source. The driving mechanism actuates a force on the hydraulic coupler/system, which transfers the force to the target fluid in order to selectively dispense an amount of target fluid. Moreover, as will be further discussed herein, a driving mechanism may actuate a force on the hydraulic coupler/system to fill at least a portion of a container with target fluid.

As illustrated in the embodiment of FIG. 1, another feature is disclosed. A controller 22 may be coupled to actuator 12 to cause actuator 12 to create a precise force on hydraulic coupler 14. As will be discussed below, one example of a controller is a computer device that may be selectively programmed to control actuator 12. Embodiments of the present invention embrace the use of feedback, such as feedback sent from actuator 12 to controller 22. An input device 24 may be coupled to controller 22 to enable user input. The control of the force created by the driving mechanism (actuator 12) and transferred to hydraulic coupler enables for a precise volumetric or metered dose or amount of target fluid to be dispensed.

Figure 3:
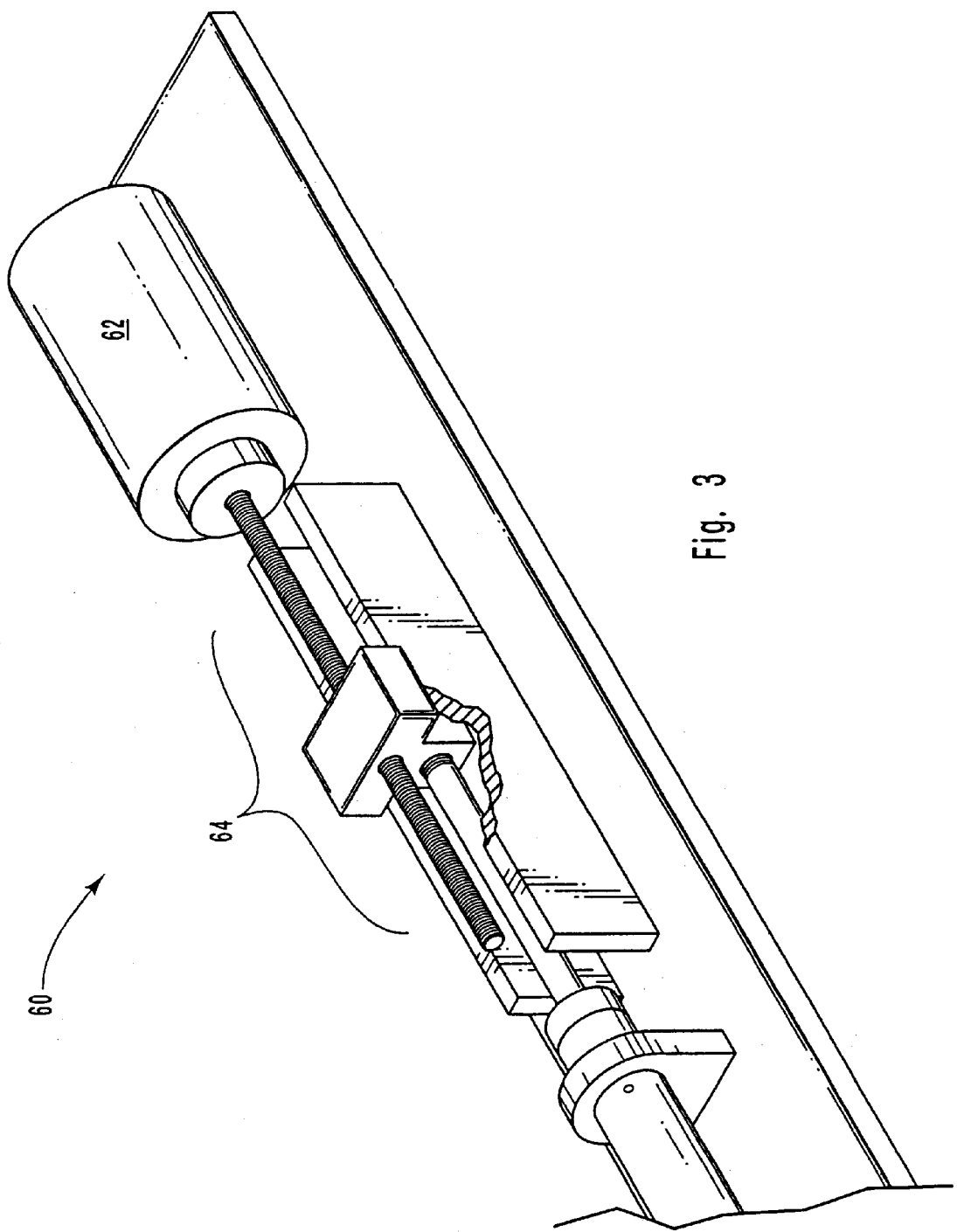
FIG. 3 illustrates an alternative actuator that may be used in association with the present invention.
Figure 4:
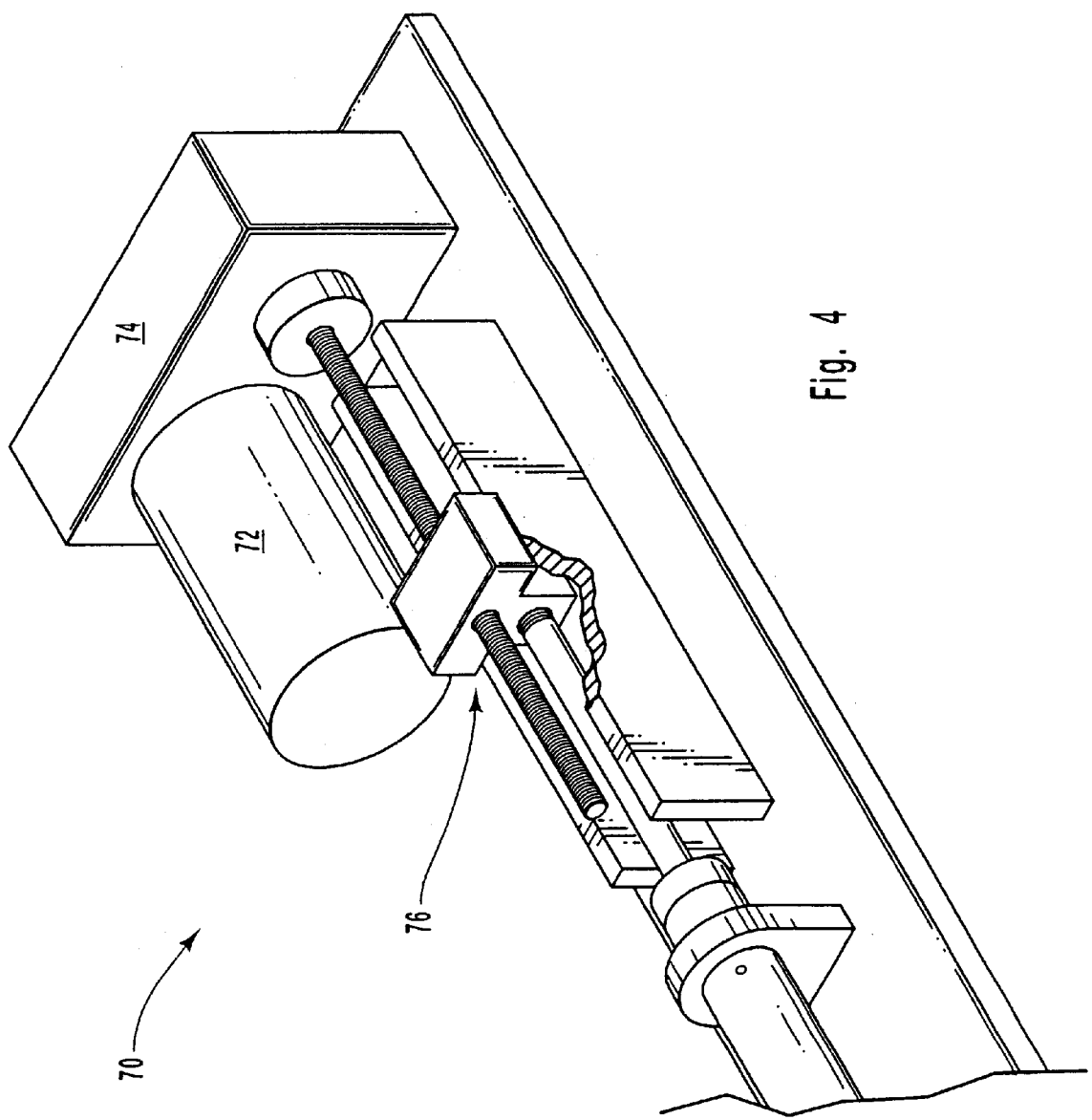
FIG. 4 illustrates another alternative an actuator that may be used in association with the present invention.

Those skilled in the art will appreciate that a variety of different types and sizes of driving mechanisms and configurations thereof may be used in accordance with the present invention to selectively dispense target fluid. For example, with reference to FIGS. 3 and 4 two alternative embodiments of driving mechanisms are provided. In FIG. 3, a representative driving mechanism 60 is illustrated that includes motor 62, which is an example of an actuator, and driving components 64 that provide a force onto a hydraulic coupler/system. Similarly, in FIG. 4 a representative driving mechanism 70 is illustrated that includes motor 72, gear box 74 and driving components 76. Thus, driving mechanisms used in accordance with the present invention may be a direct-drive mechanism, may include one or more belts and/or gears, and/or may utilize some type of transmission or gear change. Furthermore, the drive mechanisms may be in-line or indirect. Moreover, any driving mechanism is contemplated so long as it permits the user to selectively choose the amount of force created, i.e., displacement of driving component which acts upon hydraulic coupler 14.

Those skilled in the art will appreciate that embodiments of the present invention embrace a variety of different system configurations. For example, in one embodiment a dispensing system is configured in accordance with the present invention to manually dispense target fluid. In another embodiment, a dispensing system is configured to automatically dispense a volumetric amount of target fluid. For example, a distal portion of system 10 (FIG. 1) including connector 17 and container 16 may be coupled to an X-Y or an X-Y-Z mechanical system or mechanism that receives input from a controller, such as controller 22 or another controller or computer device, to precisely locate container 16 and dispense a precise volumetric amount of the target fluid within container 16 at the desired location. In a further embodiment, a system may include a plurality of containers to selectively and accurately dispense, for example, a multiple-part target fluid or multiple volumetric amounts of the target fluid simultaneously or in a series of dispensing events.

Figure 5:
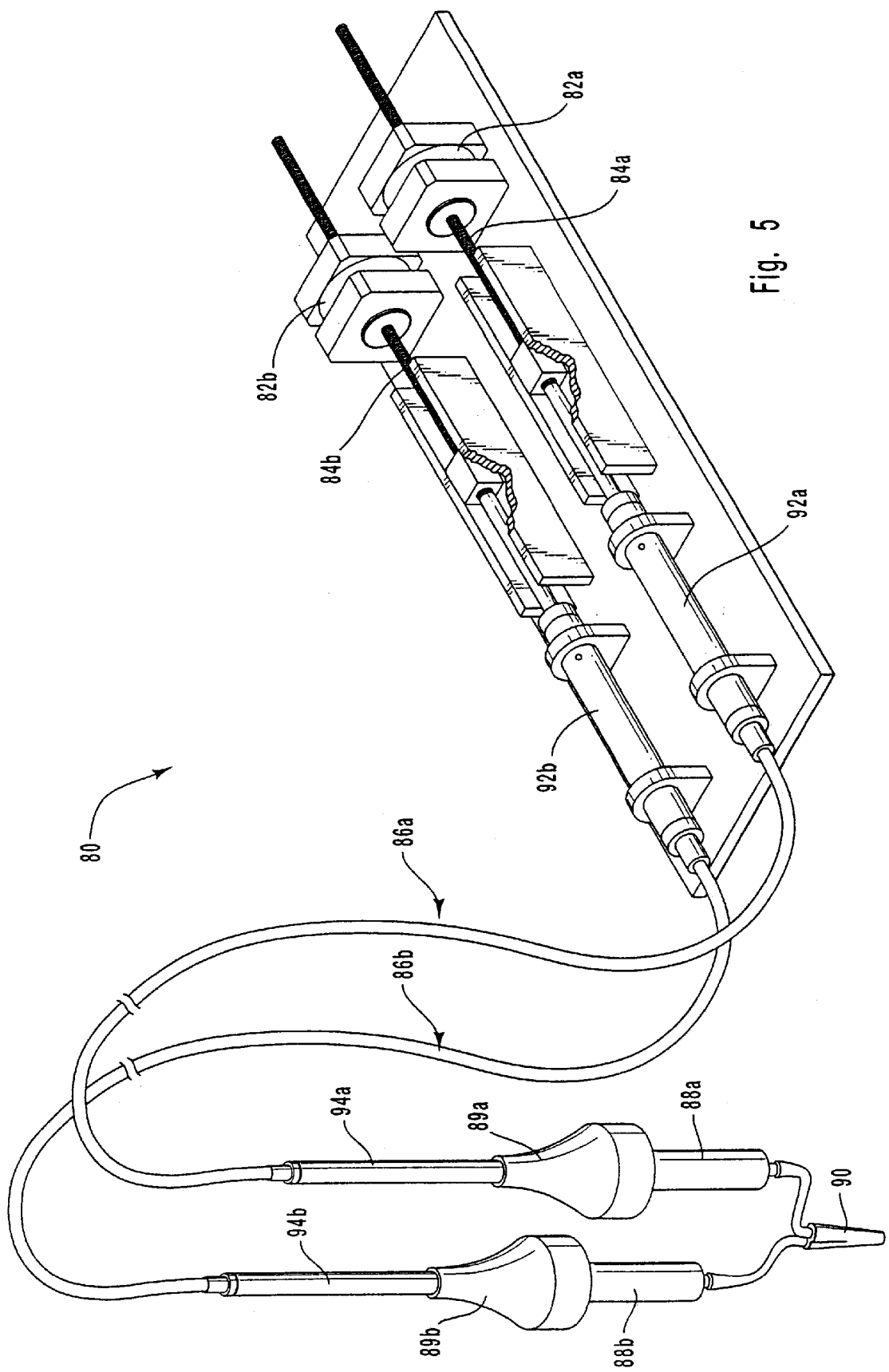
FIG. 5 illustrates a representative system that may be used in accordance with the present invention to mix and/or dispense a multipart target fluid therefrom, or to dispense a plurality of volumetric amounts of one or more target fluids.

For example, and with reference to FIG. 5, an alternative embodiment of the present invention is illustrated as system 80, which includes multiple actuators 82, hydraulic couplers 86, and containers 88. The combination of hydraulic couplers 86 is an example of hydraulic means. Furthermore, while two actuators, hydraulic couplers, and containers are illustrated, embodiments of the present invention embrace more than two or any combination of any number of actuators, hydraulic couplers, and containers. Furthermore, the number of actuators, hydraulic couplers and containers are not required to dispense directly proportional amounts of target fluid(s). Still further, another example one embodiment of the present invention includes a single actuator and multiple hydraulic couplers and containers.

In FIG. 5, a first target fluid is contained within container 88a and a second target fluid is contained within container 88b. This embodiment is useful for such applications as dispensing a two-part target fluid, such as a two-part epoxy. In the illustrated embodiment, a chamber 90, which may include a vortex (not shown), is coupled to containers 88. As target fluids are dispensed from containers 88, the target fluids are mixed in chamber 90 and dispensed therefrom. The use of multiple actuators enables the ration of each target fluid of the resultant combination of target fluids to be controlled. Therefore, in accordance with the present invention a multi-part target fluid is volumetrically dispensed that may include a direct ratio (e.g., 1:1) of target fluids or an indirect ration (e.g., 1:2, 1:10, 1:100) of target fluids. In another embodiment, chamber 90 may direct different target fluid to be dispensed without mixing but in a spaced or relative position to each other. While FIG. 5 illustrates the ability to dispense two target fluids, any plurality of target fluids may be so dispensed.

Utilizing a Computer Device

As provided above, one or more controllers may be used to control one or more actuators. One example of a controller is a computer device. As such, the following provides a discussion relating to a computer device that may be selectively used in accordance with the present invention.

Embodiments of the present invention embrace the use of one or more computer readable media to hydraulically and volumetrically fill a container with target fluid and/or dispense target from a container, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Figure 6:
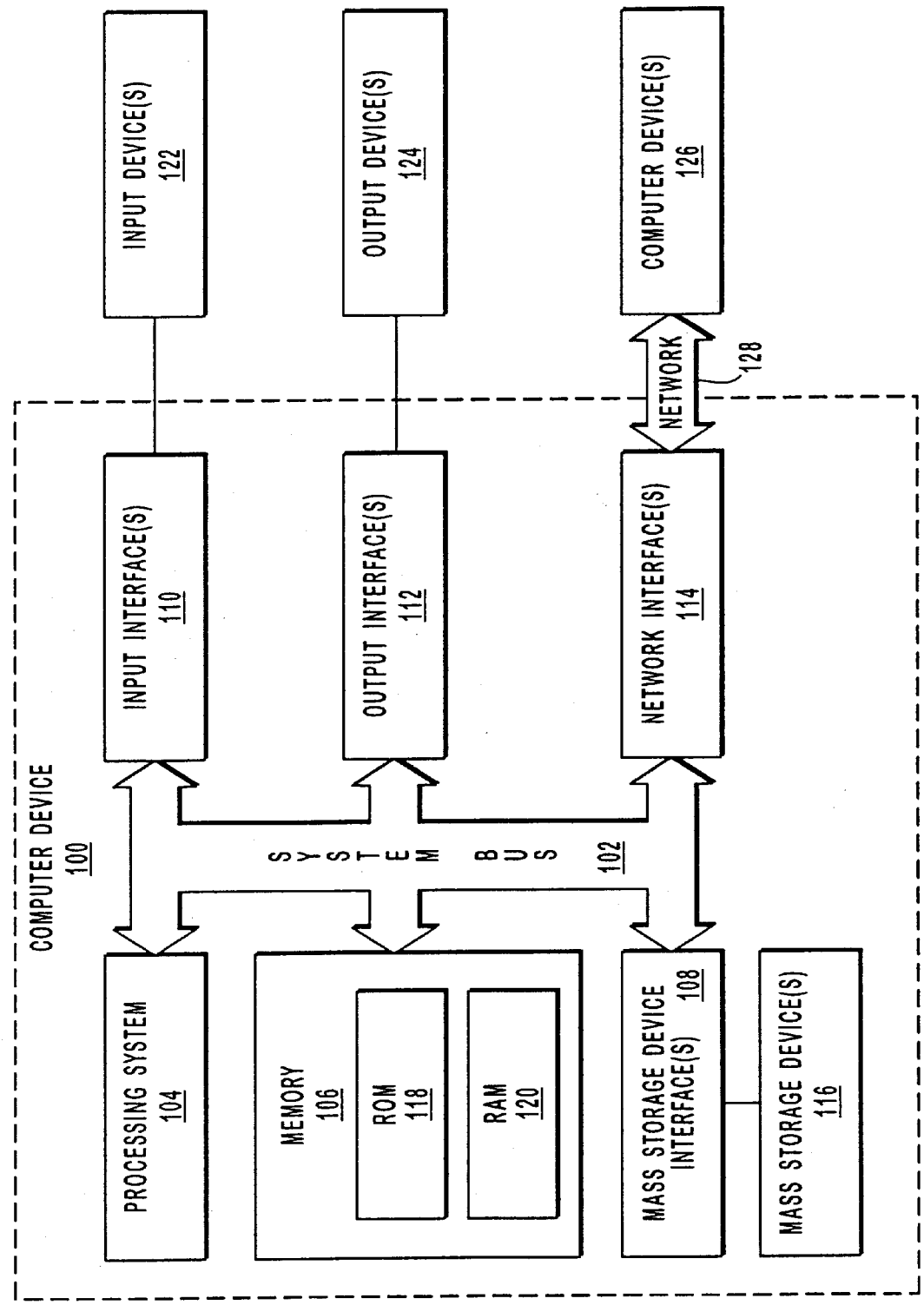
FIG. 6 provides a representative controller system that may be used in association with the present invention to dispense an accurate a precise volumetric amount of target fluid.

With reference to FIG. 6, a representative system for use in accordance with the present invention includes computer device 100, which may be a general-purpose or special-purpose computer. For example, computer device 100 may be a personal computer, a notebook computer, a personal digital assistant ("PDA") or other hand-held device, a workstation, a minicomputer, a mainframe, a supercomputer, a multi-processor system, a network computer, a programmable logic controller, a processor-based consumer electronic device, or the like.

Computer device 100 includes system bus 102, which may be configured to connect various components thereof and enables data to be exchanged between two or more components. System bus 102 may include one of a variety of bus structures including a memory bus or memory controller, a peripheral bus, or a local bus that uses any of a variety of bus architectures. Typical components connected by system bus 102 include processing system 104 and memory 106. Other components may include one or more mass storage device interfaces 108, input interfaces 110, output interfaces 112, and/or network interfaces 114, each of which will be discussed below.

Processing system 104 includes one or more processors, such as a central processor and optionally one or more other processors designed to perform a particular function or task. It is typically processing system 104 that executes the instructions provided on computer readable media, such as on memory 106, a magnetic hard disk, a removable magnetic disk, a magnetic cassette, an optical disk, or from a communication connection, which may also be viewed as a computer readable medium.

Memory 106 includes one or more computer readable media that may be configured to include or includes thereon data or instructions for manipulating data, and may be accessed by processing system 104 through system bus 102. Memory 106 may include, for example, ROM 118, used to permanently store information, and/or RAM 120, used to temporarily store information. ROM 118 may include a basic input/output system ("BIOS") having one or more routines that are used to establish communication, such as during start-up of computer device 100. RAM 120 may include one or more program modules, such as one or more operating systems, application programs, and/or program data.

One or more mass storage device interfaces 108 may be used to connect one or more mass storage devices 116 to system bus 102. The mass storage devices 116 may be incorporated into or may be peripheral to computer device 100 and allow computer device 100 to retain large amounts of data. Optionally, one or more of the mass storage devices 116 may be removable from computer device 100. Examples of mass storage devices include hard disk drives, magnetic disk drives, tape drives and optical disk drives. A mass storage device 116 may read from and/or write to a magnetic hard disk, a removable magnetic disk, a magnetic cassette, an optical disk, or another computer readable medium. Mass storage devices 116 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 110 may be employed to enable a user to enter data and/or instructions to computer device 100 through one or more corresponding input devices 122. The input allows, for example, control of the amount and/or type of target fluid that is being filled and/or dispensed in accordance with the present invention. Examples of such input devices include a keyboard and alternate input devices, such as a mouse, trackball, light pen, stylus, or other pointing device, a microphone, a joystick, a game pad, a satellite dish, a scanner, and the like. Similarly, examples of input interfaces 110 that may be used to connect the input devices 122 to the system bus 102 include a serial port, a parallel port, a game port, a universal serial bus ("USB"), a firewire (IEEE 1394), or another interface.

One or more output interfaces 112 may be employed to connect one or more corresponding output devices 124 to system bus 102. Examples of output devices include a monitor or display screen, a speaker, a printer, and the like. A particular output device 124 may be integrated with or peripheral to computer device 100. Examples of output interfaces include a video adapter, an audio adapter, a parallel port, and the like.

One or more network interfaces 114 enable computer device 100 to exchange information with one or more other local or remote computer devices, illustrated as computer devices 126, via a network 128 that may include hardwired and/or wireless links. The data exchange enables, for example, feedback of information to another system. Examples of network interfaces include a network adapter for connection to a local area network ("LAN") or a modem, wireless link, or other adapter for connection to a wide area network ("WAN"), such as the Internet. The network interface 114 may be incorporated with or peripheral to computer device 100. In a networked system, accessible program modules or portions thereof may be stored in a remote memory storage device. Furthermore, in a networked system computer device 100 may participate in a distributed computing environment, where functions or tasks are performed by a plurality of networked computer devices. Those skilled in the art will appreciate that the invention may be practiced in networked computing environments with many types of computer system configurations that are used in association with a hydraulic, volumetric target fluid dispenser for accurately dispensing target fluid in accordance with the present invention.

Thus, as discussed herein, the embodiments of the present invention embrace a variety of systems and methods for hydraulically and volumetrically dispensing fluid. More particularly, the present invention relates to systems and methods for dispensing a known volume of target fluid, whether in a liquid and/or gaseous state, through the use of a hydraulic system. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A target fluid dispensing system, the system comprising:
    a hydraulic mechanism comprising a first hydraulic liquid, a master piston and a slave piston;
    actuating means coupled to the hydraulic mechanism and configured to selectively actuate the master piston; and
    dispensing means coupled to the hydraulic mechanism, wherein the dispensing means is configured to contain a first target fluid and to selectively dispense a known volume of the first target fluid upon exertion of a force by the master piston onto the slave piston.

2. A target fluid dispensing system as recited in claim 1, wherein the dispensing means is selectively coupled to the hydraulic mechanism.

3. A target fluid dispensing system as recited in claim 2, wherein the dispensing means is disposable.

4. A target fluid dispensing system as recited in claim 1, wherein the hydraulic mechanism includes a plurality of hydraulic couplers.

5. A target fluid dispensing system as recited in claim 1, wherein the actuating means includes a plurality of driving mechanisms.

6. A target fluid dispensing system as recited in claim 1, wherein the actuating means includes a controller coupled to at least one driving mechanism.

7. A target fluid dispenser comprising:
    a hydraulic coupler that includes a first hydraulic liquids, a master piston and a slave piston, wherein the hydraulic coupler is a closed-loop system;
    a first driving mechanism configured to create a force to selectively actuate the master pistons, wherein the first driving mechanism is coupled to the hydraulic coupler; and
    a first container configured to contain a first target fluid separate from the first hydraulic liquid, wherein the first container is coupled to the hydraulic coupler and selectively dispenses a known volume of the first target fluid upon actuation of the master piston.

8. A target fluid dispenser as recited in claim 7, further comprising a controller coupled to the first driving mechanism.

9. A target fluid dispenser as recited in claim 8, wherein the controller is a computer device.

10. A target fluid dispenser as recited in claim 7, wherein the first driving mechanism comprises at least one of:
    (i) a step motor;
    (ii) a linear actuator;
    (iii) a servomotor; and
    (iv) a pneumatic motor.

11. A target fluid dispenser as recited in claim 7, wherein the first hydraulic liquid comprises at least one of:
    (i) silicone;
    (ii) alcohol;
    (iii) oil; and
    (iv) water.

12. A target fluid dispenser as recited in claim 7, wherein the first target fluid comprises one of:
    (i) a lubricant;
    (ii) a sealant;
    (iii) an adhesive;
    (iv) a paint;
    (v) a medication;
    (vi) a solvent;
    (vii) a powder;
    (viii) a food product;
    (ix) a paste;
    (x) a lotion; and
    (xi) a gas.

13. A target fluid dispenser as recited in claim 7, further comprising:
- a second hydraulic coupler that includes a second hydraulic liquid, a second master piston and a second slave piston, wherein the second hydraulic coupler is a closed-loop system;
- a second driving mechanism configured to selectively actuate the master pistons of the second hydraulic coupler to create a second force, wherein the second driving mechanism is coupled to the second hydraulic coupler; and
- a second container configured to contain a second target fluid separate from the second hydraulic liquid, wherein the second container is coupled to the second hydraulic coupler and dispenses a known volume of the second target fluid upon the creation of the second force.

14. A target fluid dispenser as recited in claim 13, further comprising a chamber coupled to the first and second containers, wherein the chamber is configured to receive the dispensed volumes of the first and second target fluids, to mix the dispensed volumes, and to selectively dispense a resultant target fluid that comprises the first and second target fluids.

15. A target fluid dispenser as recited in claim 13, further comprising a chamber coupled to the first and second containers, wherein the chamber is configured to receive the dispensed volumes of the first and second target fluids and to selectively dispense the first and second target fluids such that the dispensed first and second target fluids are relatively positioned.

16. A target fluid dispenser as recited in claim 13, further comprising a controllers coupled to at least one of:
  (i) the first driving mechanism; and
  (ii) the second driving mechanism.

17. A method for volumetrically dispensing target fluid, the method comprising the steps for:
- providing a first target fluid in a dispenser;
- containing a hydraulic liquid separate from the first target fluid;
- selectively engaging a master piston to create a force on the hydraulic liquid;
- transferring the force on the hydraulic liquid to a slave piston; and
- using the slave piston to dispense a known volume of the first target fluid.

18. A method as recited in claim 17, wherein the step for selectively engaging comprises the step for providing input to a controller to engage the first piston.

19. A method as recited in claim 17, wherein the step for providing includes a step for filling at least a portion of a dispenser with the target fluid.

20. A method as recited in claim 17, wherein the step for containing a hydraulic liquid and the step for transferring the force are performed by a closed-loop hydraulic coupler.

21. A method as recited in claim further comprising the steps for:
- providing a second target fluid;
- containing a second hydraulic liquid separate from the second target fluid;
- selectively engaging a second master piston to create a force on the second hydraulic liquid; and
- transferring the force on the second hydraulic liquid to a second slave piston;
- using the second slave piston to dispense a known volume of the second target fluid.

22. A method as recited in claim 21, further comprising the step for:
- selectively mixing the known volume dispensed of the first target fluid with the known volume dispensed of the second target fluid to obtain a resultant target fluid; and
- selectively dispensing the resultant target fluid.

23. A computer program product for implementing within a system a method for volumetrically dispensing target fluid, the computer program product comprising:
- a computer readable medium for providing computer program code means utilized to implement the method, wherein the computer program code means comprises executable code for implementing the step for:
- selectively engaging a master piston to create a force on a first hydraulic liquid, wherein the first hydraulic liquid transfers the force to a slave piston to dispense a known volume of a first target fluid, and wherein the first hydraulic liquid is contained separate from the first target fluid.

* * * * *